United States Patent [19]

Maldavs

[11] 4,347,870
[45] Sep. 7, 1982

[54] LEVER-TYPE QUICK DISCONNECT COUPLING

[75] Inventor: Ojars Maldavs, Lincoln, Nebr.

[73] Assignee: Gould Inc., Rolling Meadows, Ill.

[21] Appl. No.: 149,628

[22] Filed: May 14, 1980

[51] Int. Cl.³ .............................................. F16L 37/28
[52] U.S. Cl. ............................ 137/614.05; 251/149.6
[58] Field of Search ................ 137/614.04, 614.05, 137/614.06; 251/149.6, 149.9

[56] References Cited

U.S. PATENT DOCUMENTS

| | | | |
|---|---|---|---|
| 3,166,343 | 1/1965 | Wittren | 205/1 X |
| 3,330,313 | 7/1967 | Rosell | 137/614.06 |
| 3,680,591 | 8/1972 | Vik | 137/614.05 |
| 3,710,823 | 1/1973 | Vik | 137/614.06 X |
| 3,874,411 | 4/1975 | Vik | 137/614.06 |
| 4,009,729 | 3/1977 | Vik | 137/614.05 |
| 4,181,150 | 1/1980 | Maldavs | 137/614.06 |

*Primary Examiner*—A. Michael Chambers
*Attorney, Agent, or Firm*—George P. Edgell; Edward E. Sachs; Russell E. Baumann

[57] ABSTRACT

A quick disconnect female coupling is provided with a lever-operated valve. The lever operates a cam inside the coupling which pulls open the valve assembly of the female coupling and pushes a plunger which opens the valve of a male coupling which is connected to the female coupling. The push-pull action of the cam provides straight linear forces for opening the valves, and the cam is positioned within a large flow passage in the female coupling rather than near the valve.

8 Claims, 7 Drawing Figures

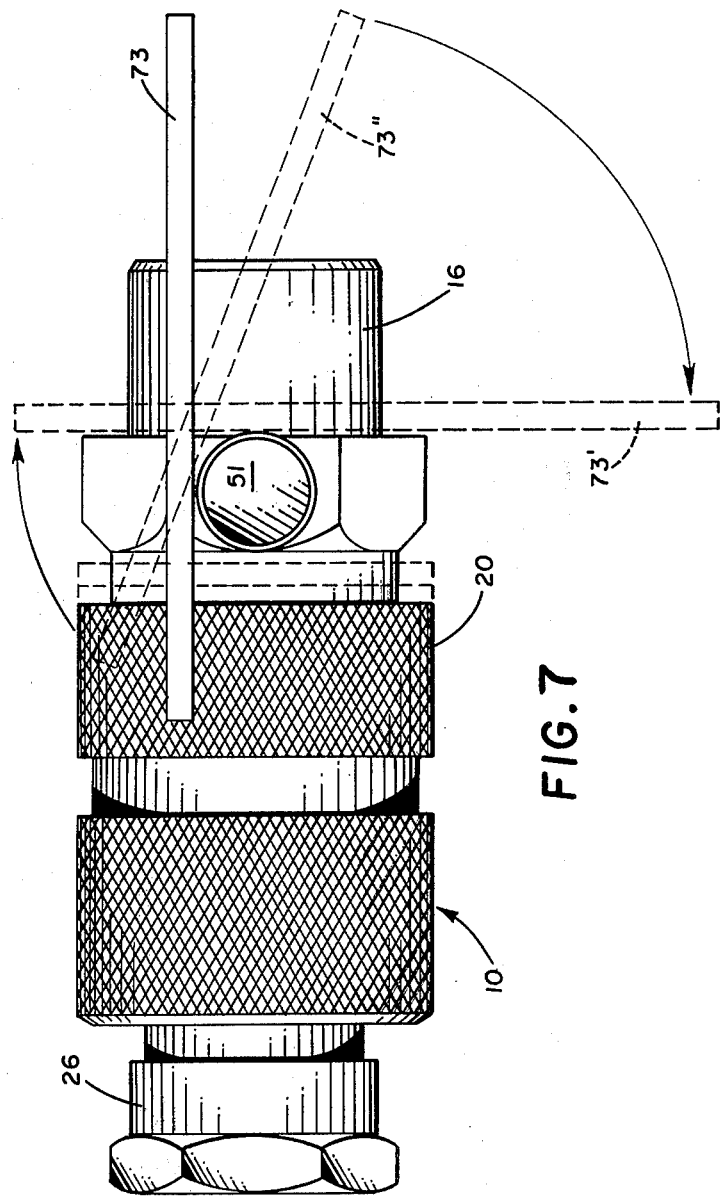

LEVER-TYPE QUICK DISCONNECT COUPLING

BACKGROUND AND SUMMARY

This invention relates to quick disconnect couplings for connecting and disconnecting hydraulic lines. More particularly, the invention relates to a lever-operated female quick disconnect coupling.

Quick disconnect couplings are conventionally used for connecting hydraulic lines which are used, for example, on agricultural tractors. A female coupling is generally mounted on the tractor and is connected to the hydraulic system of the tractor. A mating male coupling is mounted on the hydraulic hose of an agricultural implement which is to be towed by the tractor, and the hydraulic system of the implement can be connected to the hydraulic system of the tractor by connecting the two couplings.

Conventional quick disconnect couplings cannot be connected and disconnected when the couplings are pressurized with hydraulic fluid. Lever-type couplings are available in which the female coupling is provided with a lever for providing a mechanical advantage in opening the valves when there is trapped hydraulic pressure in either or both couplings. Lever-type couplings are shown in my co-pending application Ser. No. 832,182, filed Sept. 12, 1977 and in U.S. Pat. Nos. 4,009,729, 3,710,823 and 3,166,343.

Most lever-type quick disconnect couplings have one or more of the following disadvantages:

1. Excessive oil spillage during each disconnection. The large volume of oil between the valves is spilled during each disconnection.
2. High pressure drop caused by long turbulent flow passages.
3. High pressure drop caused by the lever-operated cam of the coupling being located between valves of the two couplings, which is at the most flow-restrictive location.
4. High manufacturing cost due to extra long parts, complicated shapes, and large number of parts.
5. The cam works directly on the valve ball, which limits the design to ball-type valves. Due to the metal-to-metal sealing characteristics, ball-type valves can leak.

My new coupling overcomes these limitations in the following ways:

1. The cam is located at the rear portion of the valve assembly where the flow passage is large. This minimizes flow restrictions and pressure drop.
2. Since the cam is not working directly on the sealing end of the valve assembly, there is more flexibility in valve design. Thus, a soft-seat valve is used to eliminate leakage.
3. Since the force applied against the male coupling is linear, the female coupling will work with poppet-type as well as ball-type male couplings. The cam as used in U.S. Pat. Nos. 3,166,343 and 4,009,729 will work only on ball-type valves due to the cam rotational force.
4. The design minimizes the number of parts, and the parts are short in length. Therefore, manufacturing costs are minimized.
5. The design permits a dual angle cam to gain mechanical advantage in opening against internal pressure and maintaining a short lever length.

BRIEF DESCRIPTION OF THE DRAWINGS

The invention will be explained in conjunction with an illustrative embodiment shown in the accompanying drawings, in which:

FIG. 7 is a top plan view of the male and female couplings showing the manner in which the lever is moved from its open position to its closed position when the couplings are disconnected.

DESCRIPTION OF THE PREFERRED EMBODIMENT

Figure 1:
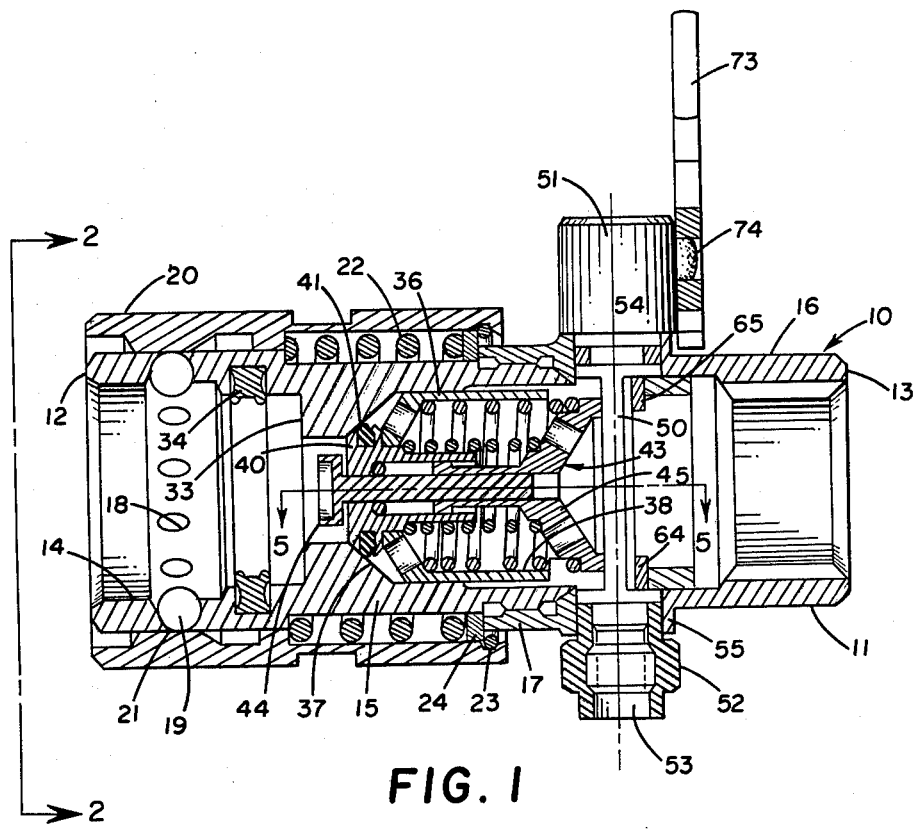
FIG. 1 is a longitudinal sectional view of the inventive coupling device showing the lever and valve in their closed positions.
Figure 2:
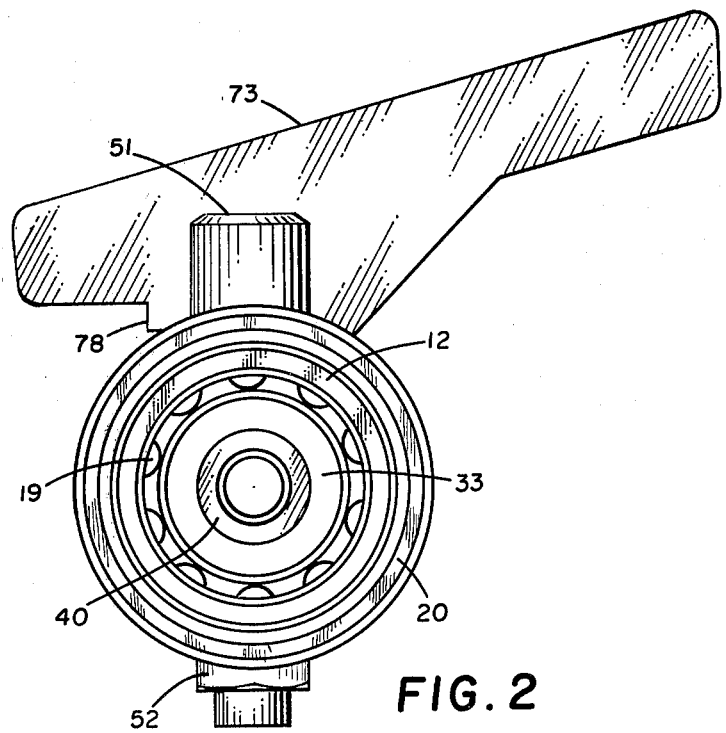
FIG. 2 is an end view of the coupling taken along the line 2—2 of FIG. 1.

Referring first to FIG. 1, a female quick disconnect coupling 10 includes an outer housing 11 having a front end 12, a rear end 13, and an axially extending central bore 14. The housing is comprised of a front portion 15 and a rear portion 16. The rear portion 16 includes a radially enlarged tubular portion 17 which surrounds the rear end of the front portion 15 and is connected thereto.

The forward end of the front portion of the housing is provided with a plurality of openings 18, and locking balls 19 are retained in the openings by a locking collar 20 which is slidable axially on the housing. The locking collar includes a camming portion 21 which forces the locking balls radially inwardly. A coil spring 22 resiliently biases the locking collar into its locking position illustrated in FIG. 1, and a retaining ring 23 on the rear end of the locking collar abuts a stop ring 24 attached to the housing to prevent further movement to the left. When the locking collar is moved to the right, the camming portion 21 of the locking collar moves out of engagement with the locking balls, and the locking balls can be forced outwardly to permit a male coupling to be inserted into the bore of the female coupling.

Figure 3:
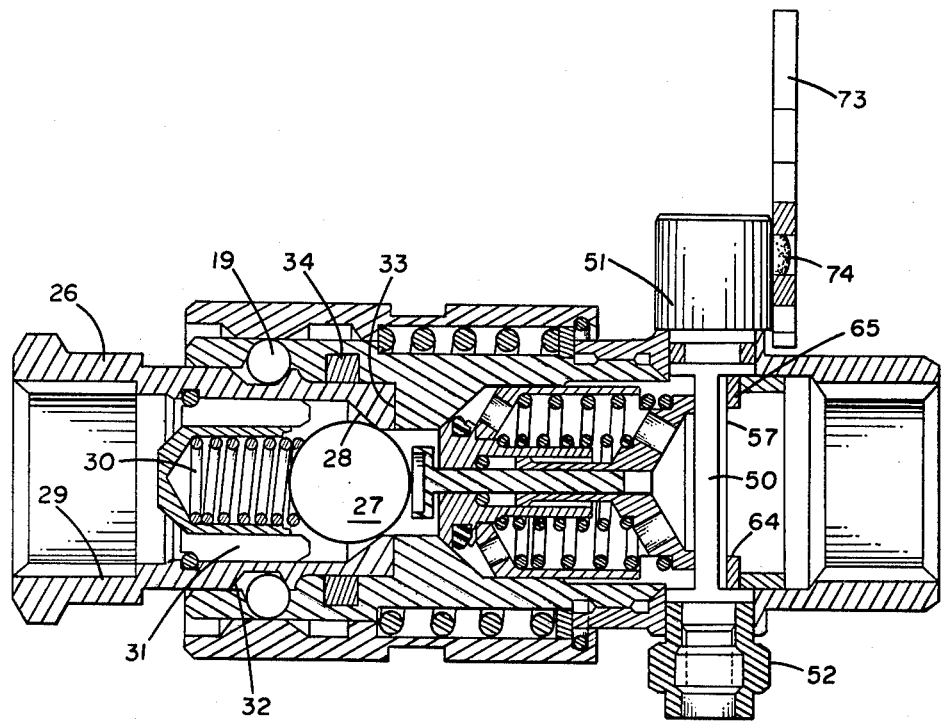
FIG. 3 is a sectional view similar to FIG. 1 showing a male coupling connected to the female.

A conventional male coupling 26 is shown coupled to the female coupling in FIG. 3. The male coupling includes a ball check valve 27 resiliently urged against a seat 28 provided within a generally cylindrical housing 29. The ball is urged against the seat by a spring 30, and rearward travel of the ball beyond its fully open position is prevented by a stop member 31. The housing of the male coupling is provided with a locking groove 32 which receives the locking balls of the female coupling when the two couplings are connected as in FIG. 3. An annular shoulder 33 inside the female coupling provides a stop for the front end of the male coupling, and the two couplings are sealed by a gasket 35 which is retained within a groove in the female housing.

Referring again to FIG. 1, a valve assembly 36 is slidably mounted within the female coupling behind a frusto-conical valve seat 37 on the housing of the coupling. The valve assembly includes a generally cylindrical puller member 38 which has a frusto-conical front wall 39 (FIG. 5) and a generally cylindrical plug member 40 which is secured within a central opening in the front wall of the puller member. The plug abuts the valve seat 37 and carries a gasket 41 which sealingly engages the valve seat. The front wall 39 of the puller member is provided with a plurality of openings 42 (FIG. 5) to permit fluid to flow through the puller member. A pusher assembly 43 is slidably mounted within the plug 40 and includes a plunger 44 which is slidable within a central opening in the plug 40 and a base 45. The rear end of the plunger is inserted into the base and secured therein so that the plunger and base move together. The tubular front end 46 (FIG. 5) of the base is telescopingly mounted within the plug 40 and includes an annular enlargement 47 which slides along the cylindrical wall of the plug. A gasket 48 provides a fluid seal between the plunger and the plug. A plurality of fluid openings 49 are provided in the frusto-conical rear end of the base.

A camming shaft 50 extends transversely through the rear tubular portion 17 of the outer housing of the female coupling and is rotatably mounted therein. The upper end of the shaft terminates in a radially enlarged head 51, and a locking cap or nut 52 is secured over the lower end 53 of the shaft to retain the shaft in the housing. Upper and lower gaskets 54 and 55 provide seals between the shaft and the housing.

Figure 5:
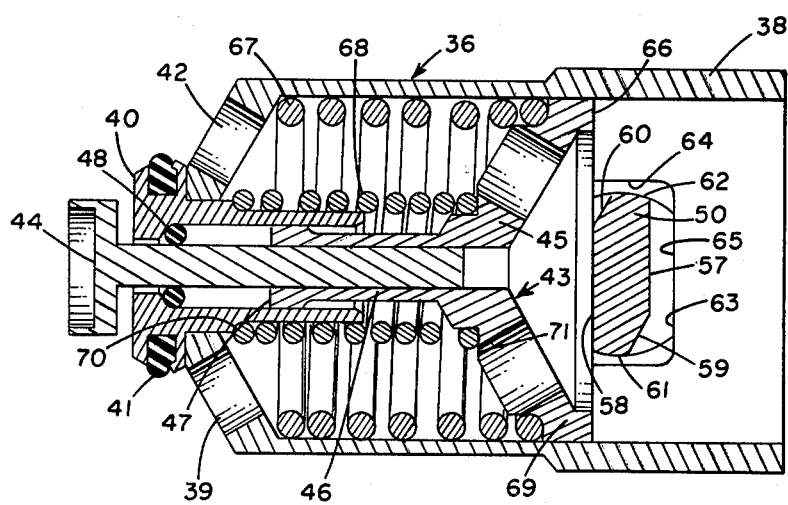
FIG. 5 is a sectional view of the internal parts of the female coupling taken along the line 5—5 of FIG. 1 with the lever in the closed position.

Comparing FIGS. 1 and 5, the camming shaft 50 is seen to be generally rectangular in cross section and includes a pair of parallel flat surfaces 57 and 58, a pair of angled flat surfaces 59 and 60, and a pair of curved surfaces 61 and 62 which engage the circular openings 63 in the housing of the coupling.

The camming shaft extends through a pair of diametrically opposed rectangular openings 64 in the cylindrical wall of the puller member 38. In FIGS. 1 and 5 the rear edges 65 of the openings 64 are spaced rearwardly of the flat surface 57 of the camming shaft.

The annular rear wall 66 of the base 45 of the pusher assembly 43 engages the flat surface 58 of the camming shaft and is urged against the camming shaft by a pair of coil springs 67 and 68. The outer spring 67 is compressed between the front wall 39 of the puller member 38 and an annular recess 69 in the base 45, and the inner spring 68 is compressed between a shoulder 70 on the plug 40 and a shoulder 71 on the base. The coil springs 67 and 68 also resiliently urge the gasket 41 of the valve assembly 36 against the valve seat 37.

A lever 73 is attached to the head 51 of the camming shaft 50 by a weld 74 (FIGS. 1 and 3). The lever is attached to the side of the head 51 so that the lever is laterally offset from the axis of rotation of the shaft.

In use, the rear end 13 of the female coupling and the rear end of the male coupling are connected to hydraulic hoses or conduits. The female coupling is shown in its closed position in FIG. 1. The coil springs 67 and 68 bias the valve assembly to the left and maintain the gasket 41 in sealing engagement with the valve seat 37. The valve assembly therefore seals the female coupling even when the hydraulic hose is pressurized with hydraulic fluid. Similarly, the male coupling is maintained closed by the spring 30 (FIG. 3) which urges the ball 27 against the valve seat 28.

The couplings are connected by sliding the locking collar 20 of the female coupling to the right against the bias of the spring 22 so that the locking balls 19 can be forced radially outwardly when the male coupling is inserted into the open front end of the female coupling. When the front end of the male coupling abuts the shoulder 33 (FIG. 1) in the bore of the female coupling, the locking collar can be released, and the spring 22 will return the locking collar to its locking position (FIG. 1). The locking balls 19 will thereby be forced into the locking groove 32 to lock the couplings together.

The lever 73 of the female coupling is still in its closed position in FIG. 3, and the valve assemblies of both couplings remain closed.

Figure 4:
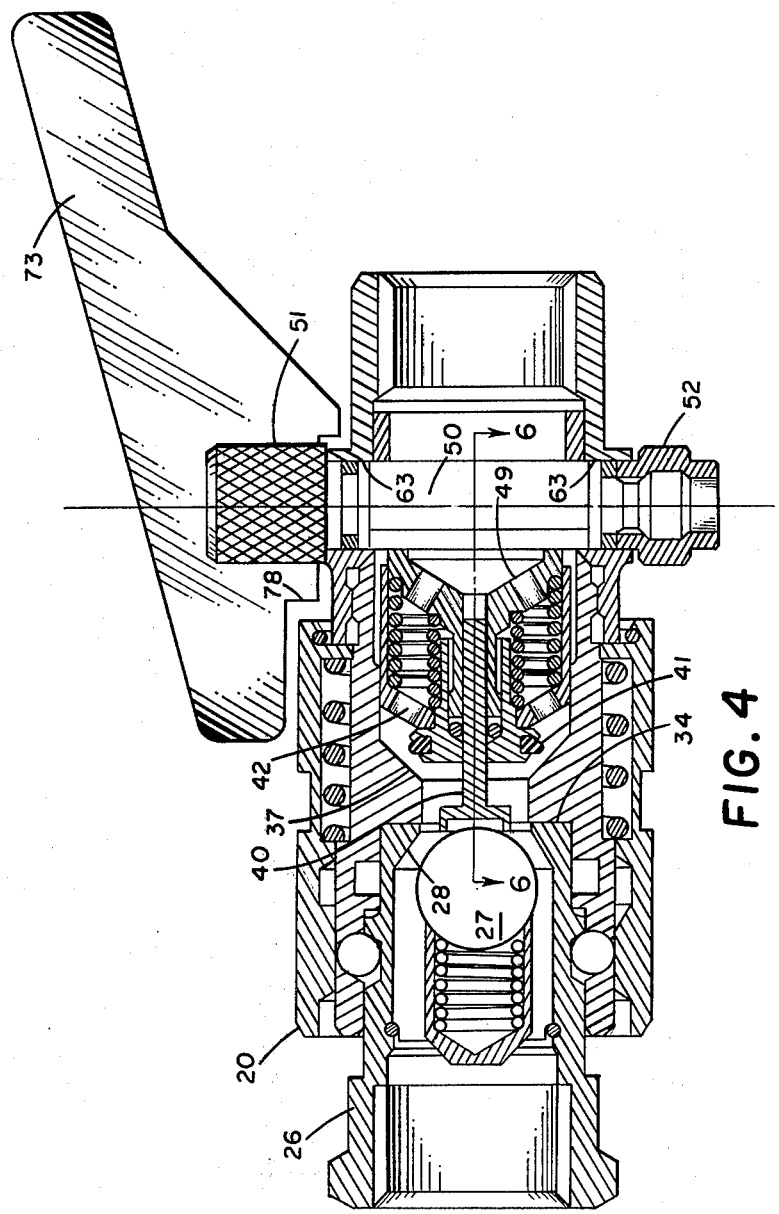
FIG. 4 is a sectional view of the male and female couplings with the lever and the valves in their open positions.

The valve assemblies are opened by moving the lever 73 to its open position illustrated in FIG. 4. The lever rotates the camming shaft 50, which does two things: It moves the pusher assembly to the left (compare FIGS. 3 and 4) to open the ball valve 27 of the male coupling, and it moves the valve assembly 36 to the right to open the female coupling.

Figure 6:
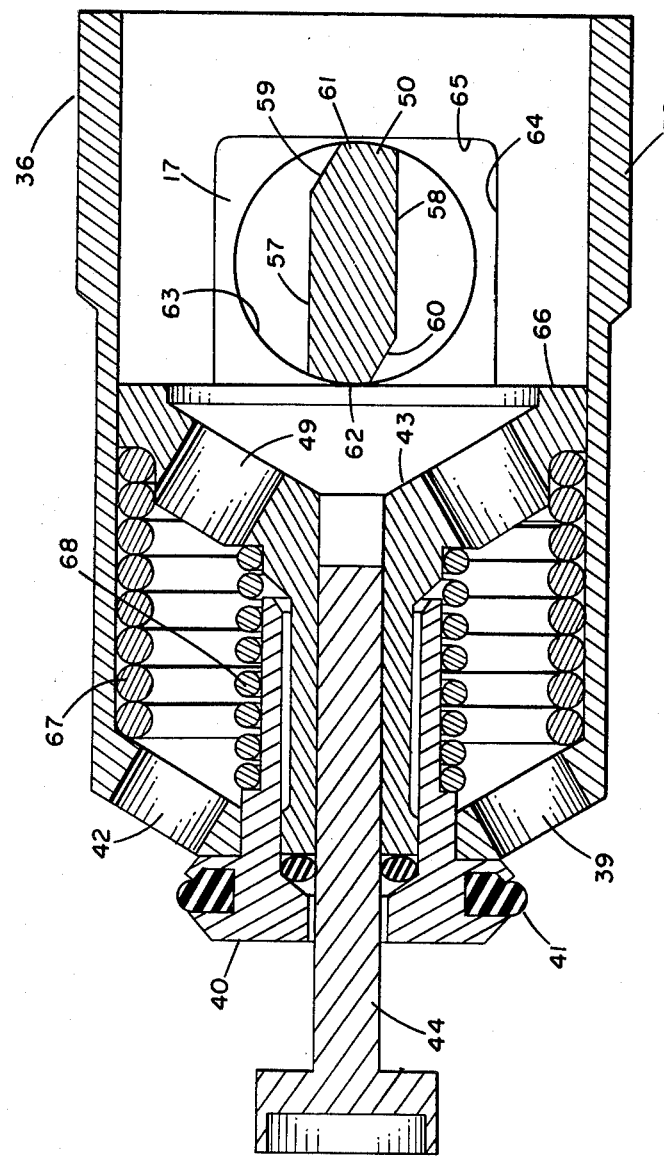
FIG. 6 is a sectional view of the internal parts of the female coupling taken along the line 6—6 of FIG. 4 with the lever in the open position.

Referring now to FIGS. 5 and 6, counter-clockwise rotation of the camming shaft 50 forces the pusher assembly 43 to the left. The base 45 of the pusher assembly slides within the cylindrical wall of the puller member 38, and the plunger 44 slides through the gasket 48 and the opening in the plug 40.

Still referring to FIGS. 5 and 6, counter-clockwise rotation of the camming shaft also forces the puller member 38 and the valve assembly 36 to the right. Since the rear edges 65 of the openings 64 in the puller member are spaced to the right of the camming shaft 50 in FIG. 5, the puller member does not begin to move until the camming shaft rotates into engagement with the edges 65. Thereafter, the camming shaft will simultaneously move the valve assembly 36 and the pusher assembly 43 in opposite directions until the camming shaft rotates 90° into its open position shown in FIGS. 4 and 6. In this position, the plunger 44 has been pushed to the left to move the ball valve away from the valve seat 28, and the valve assembly 36 has been pulled to the right to move the gasket 41 away from the valve seat 37. The end of the plunger 44 is cup shaped to provide secure engagement with the ball and to accept poppet-type male halves.

When the valve assembly of the female coupling is in the open position illustrated in FIG. 4, fluid can flow around the camming shaft, through the openings 49 in the base 43, through the openings 42 in the front end of the puller member, and through the flow passage between the gasket 41 and the valve seat 37. The camming shaft 50 is located in the large flow passage at the rear end of the female coupling rather than near the valve seat, and the restriction to fluid flow caused by the cam is therefore minimized.

The camming surfaces 57 and 59 (FIGS. 5 and 6) which act on the puller member 38 and the camming surfaces 58 and 60 which act on the pusher assembly 43 are double angled. This provides extra mechanical advantage during the initial movement of the cam and fast movement during the remaining movement of the cam.

The valve assembly 36 and the pusher assembly 43 will remain in their open positions illustrated in FIG. 4 until the lever is returned to its closed position shown in FIG. 3. Movement of the lever to its FIG. 3 position will rotate the camming shaft 50 clockwise in FIGS. 5 and 6. The coil springs 67 and 68, which were compressed by the movement of the valve assembly 36 and pusher assembly 43 in opposite directions, will urge the valve assembly and pusher assembly to return to their closed positions as the camming shaft rotates. The valves of both the female and male couplings are thereby fully closed before the male coupling is disconnected. The cam does not act directly on the female valve assembly 36 to force the gasket 41 against the valve seat 37, and a soft-seat valve is thereby provided.

On occasion, the coupling may be accidentally disconnected without first rotating the lever 73 to the closed position. If this happens, the lever will automatically close as illustrated in FIG. 7. During the disconnect cycle, the locking collar will move to the right and contact a shoulder 78 (see FIG. 4) on the lever, applying a force at that point. Since the lever is off the center line of the camming shaft 50 and head 51, the force exerted by the locking collar will cam the lever in a clockwise direction in FIG. 7 to the closed position illustrated in phantom at 73'. Referring to FIGS. 5 and 6, the lever and the camming shaft 50 are stable in the open position illustrated in FIG. 6 as long as the curved surfaces 61 and 62 of the camming shaft are in engagement with the puller member 38 and the pusher assembly 43. However, when the locking collar pushes the lever and rotates the camming shaft so that the angled surfaces 59 and 60 move into engagement with the puller member and pusher assembly (the position illustrated at 73" in FIG. 7), the forces exerted by the coil springs 67 and 68 within the valve assembly 36 will continue to rotate the camming shaft to its closed position illustrated in FIG. 5.

From the foregoing it is seen that the female coupling provides the following advantages:

1. The cam is attached to the rear portion of the valve assembly of the female coupling and pulls and pushes the valves of both couplings rather than working directly on the faces of the valves.

2. The cam provides a straight linear force to the valve of the male coupling rather than a rotational camming force on the face of the valve.

3. The cam is located in the large flow passage of the female coupling to minimize flow restriction rather than next to the valve seat which adds more restriction to the smallest passage in a coupling.

4. The design minimizes the space between the valves of the two couplings, which minimizes the amount of oil spillage during disconnection.

While in the foregoing specification a detailed description of a specific embodiment of the invention was set forth for the purpose of illustration, it will be understood that many of the details hereingiven may be varied considerably by those skilled in the art without departing from the spirit and scope of the invention.

What is claimed is:

1. A lever-type quick disconnect female coupling for coaction with a check-valve equipped male coupling, the female coupling comprising:
   (a) a generally tubular housing having a forward end and a rearward end and an axially extending bore open at said forward end for receipt of said male coupling, the housing being provided with a valve seat within the bore,
   (b) a valve assembly slidably mounted in said bore for movement axially of said bore, the valve assembly including a valve which is engageable with said valve seat in the bore and a tubular rear end portion which is provided with an opening therethrough which extends transversely to the axis of said bore of the housing,
   (c) a pusher member slidably mounted in said valve assembly for movement axially of said bore, the pusher member including a tubular rear end portion which is slidable axially within the rear end portion of the valve assembly,
   (d) cam means mounted in said housing and engageable with said valve assembly and said pusher member for moving the valve assembly and the pusher member in opposite directions, said cam means including a shaft which extends through the opening in the valve assembly and is engageable with the rear end portion of the pusher member and which is rotatable about an axis which extends transversely to the axis of the bore, the shaft having a first camming portion which is engageable with an edge portion of the opening in the valve assembly for moving the valve assembly axially in one direction and a second camming portion which is engageable with an edge portion of the rear end portion of the pusher member for moving the pusher member axially in the opposite direction, the cam means being movable between a first position in which the valve of the valve assembly engages said valve seat and the pusher member does not open the check valve of the male coupling and a second position in which the valve of the valve assembly is moved axially away from the valve seat to provide a fluid passage therebetween and the pusher member is moved axially toward the male coupling to open the check valve of the male coupling, and
   (e) a lever attached to the cam means for moving the cam means between said first and second positions.

2. The coupling of claim 1 in which the valve assembly is provided with a pair of said transversely extending openings which are diametrically opposed to each other, said shaft of said cam means extending through the diametrically opposed openings of the valve assembly.

3. The coupling of claim 1 including spring means within the valve assembly in engagement with the valve assembly and the pusher member for resiliently urging the valve assembly toward said valve seat and the pusher member away from the male coupling.

4. The coupling of claim 1 in which said first camming portion of the shaft comprises a pair of flat, angled surfaces on said shaft and said second camming portion of the shaft comprises a second pair of flat, angled surfaces on said shaft.

5. A lever-type quick disconnect female coupling for coaction with a check-valve equipped male coupling, the female coupling comprising:
   (a) a generally tubular housing having a forward end and a rearward end and an axially extending bore open at said forward end for receipt of said male coupling, the housing being provided with a valve seat within the bore,
   (b) a valve assembly slidably mounted in said bore for movement axially of said bore, the valve assembly including a valve which is engageable with said valve seat in the bore and a puller member having a generally tubular side wall and a front wall and a plug member extending through the front wall of the puller member, the front wall of the puller member being provided with at least one fluid opening therethrough,
   (c) a pusher member slidably mounted in said valve assembly for movement axially of said bore and having a plunger portion, which extends through the plug member of the valve assembly toward said forward end of the housing, (d) cam means mounted in said housing and engageable with said valve assembly and said pusher member for moving the valve assembly and the pusher member in opposite directions, said cam means including a shaft which extends through the opening in the valve assembly and is engageable with the rear end portion of the pusher member and which is rotatable about an axis which extends transversely to the axis of the bore, the shaft having a first camming portion which is engageable with an edge portion of the opening in the valve assembly for moving the valve assembly axially in one direction and a second camming portion which is engageable with an edge portion of the rear end portion of the pusher member for moving the pusher member axially in the opposite direction, the cam means being movable between a first position in which the valve of the valve assembly engages said valve seat and the pusher member does not open the check valve of the male coupling and a second position in which the valve of the valve assembly is moved axially away from the valve seat to provide a fluid passage therebetween and the pusher member is moved axially toward the male coupling to open the check valve of the male coupling, and (e) a lever attached to the cam means for moving the cam means between said first and second positions.

6. The coupling of claim 5 in which the pusher member includes a base portion which slidably engages the tubular wall of the puller member.

7. The coupling of claim 6 including a coil spring inside the puller member extending between the front wall of the puller member and the base portion of the pusher member for resiliently urging the puller member toward said valve seat and the pusher member away from the male coupling.

8. The coupling of claim 6 in which the pusher member terminates in an annular end wall which engages said cam means.

* * * * *